(12) United States Patent
Bochart

(10) Patent No.: US 6,401,595 B1
(45) Date of Patent: Jun. 11, 2002

(54) PISTON FOR AN INTERNAL COMBUSTION ENGINE AND METHOD OF ASSEMBLY

(75) Inventor: Michael R. Bochart, Delphi, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/691,372

(22) Filed: Oct. 18, 2000

(51) Int. Cl.[7] ................................................ F01B 31/08
(52) U.S. Cl. ...................................................... 92/186
(58) Field of Search ........................................... 92/186

(56) References Cited

U.S. PATENT DOCUMENTS

| | | | |
|---|---|---|---|
| 1,953,109 A | * 4/1934 | Heron | .......................... 92/186 |
| 3,221,718 A | * 12/1965 | Isley | ............................ 92/186 |
| 4,377,967 A | * 3/1983 | Pelizzoni | ..................... 92/186 |
| 4,577,595 A | * 3/1986 | Deutschmann et al. | ........ 92/186 |
| 4,986,167 A | * 1/1991 | Stratton et al. | ............... 92/186 |
| 5,144,923 A | 9/1992 | Leites et al. | |
| 5,261,363 A | * 11/1993 | Kemnitz | ....................... 92/186 |
| 5,357,920 A | 10/1994 | Kemnitz et al. | |
| 5,778,533 A | 7/1998 | Kemnitz | |

* cited by examiner

Primary Examiner—F. Daniel Lopez
(74) Attorney, Agent, or Firm—Keith P. Roberson

(57) ABSTRACT

Pistons for internal combustion engines often need additional cooling to attain better performance. One method of cooling involves adding oil to an oil gallery on bowl portion opposite a combustion zone. Adding a standpipe prevents oil from exiting immediately exiting the oil gallery. Installing the standpipe intermediate a first baffle plate and a second baffle plate improves reliability of the piston and ease of manufacturing.

10 Claims, 4 Drawing Sheets

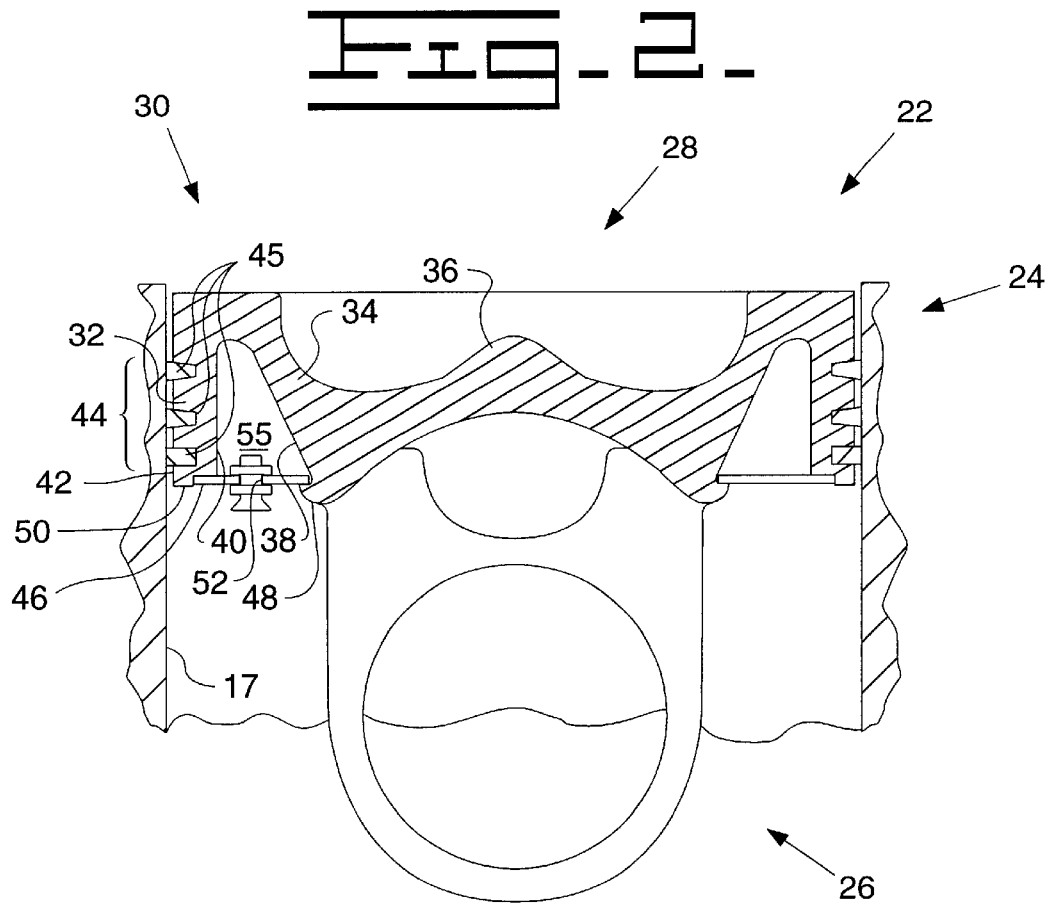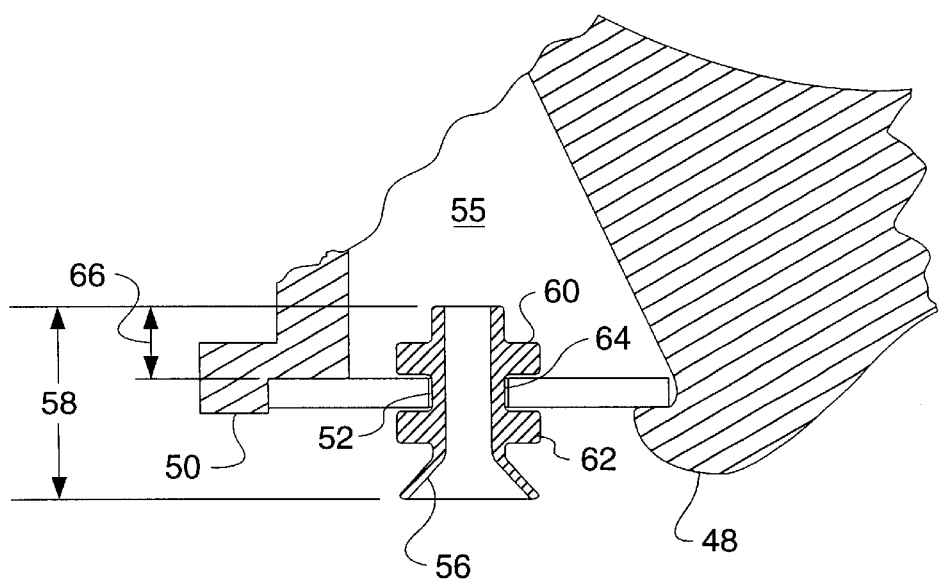

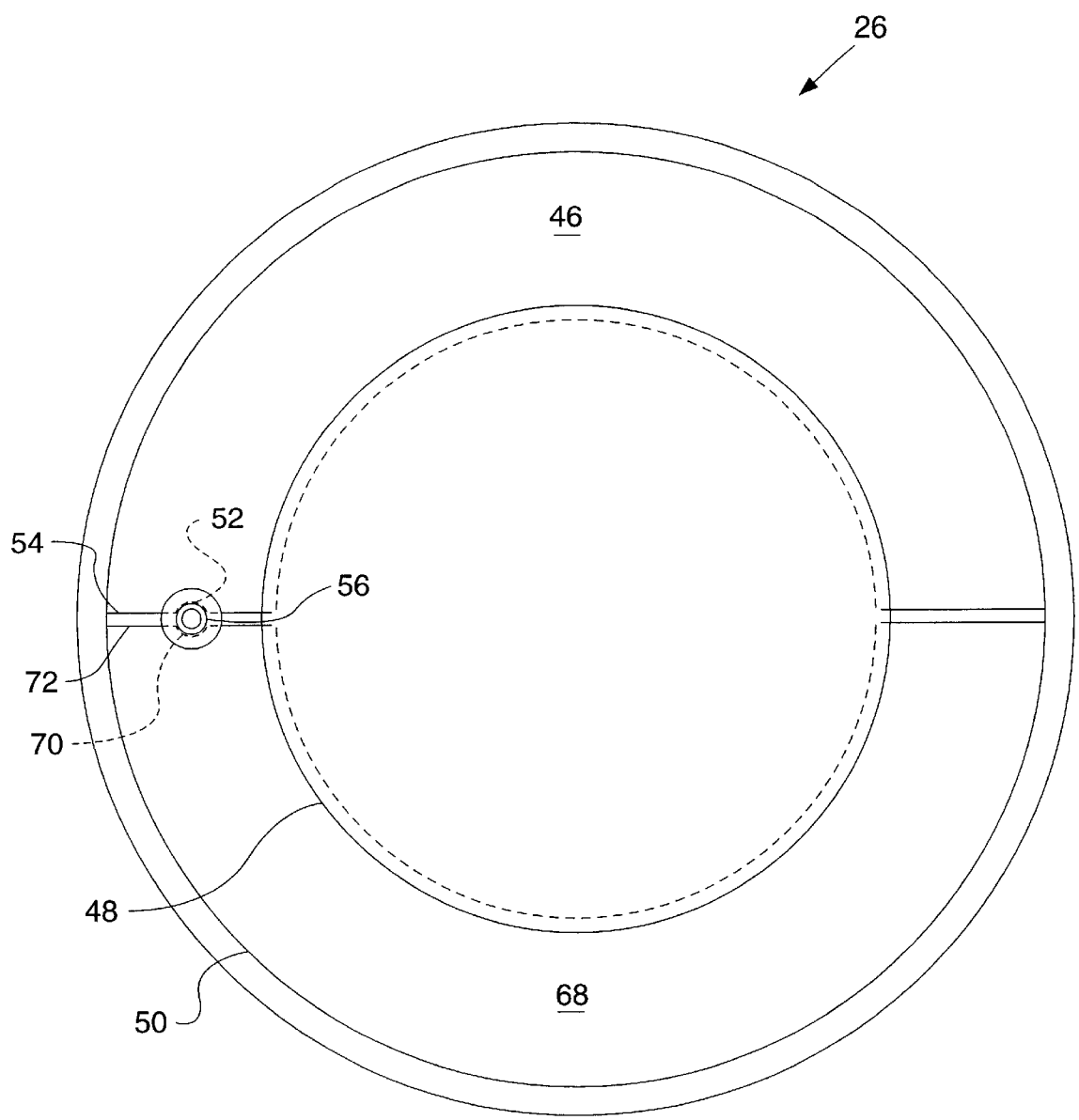

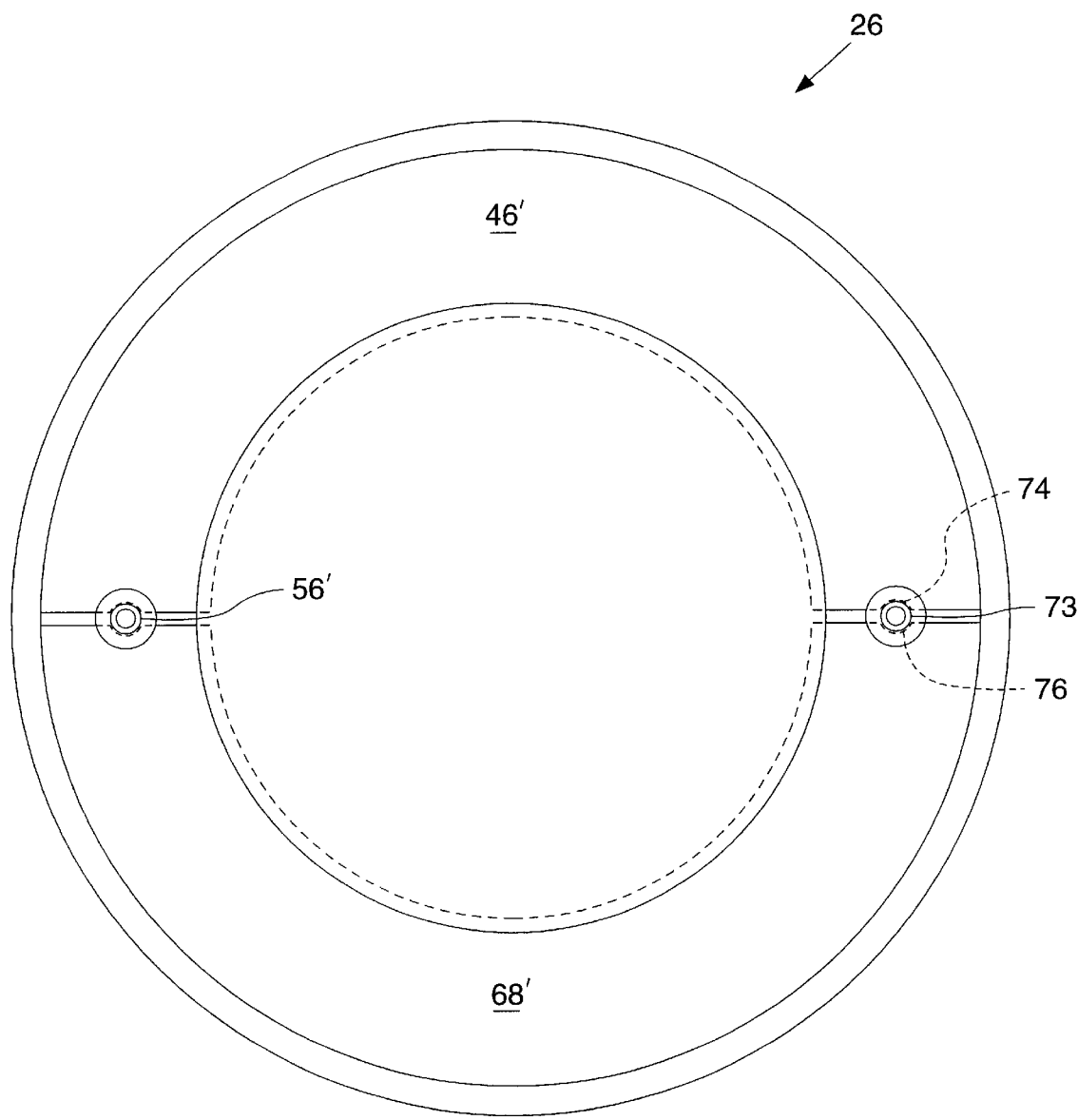

PISTON FOR AN INTERNAL COMBUSTION ENGINE AND METHOD OF ASSEMBLY

TECHNICAL FIELD

This application relates to a piston for an internal combustion engine and more specifically to a piston and method of assembling the same.

BACKGROUND ART

Manufactures continually strive to increase efficiency of internal combustion engines while also decreasing the physical size of the engine. One way of improving efficiency and reducing size has been to increase temperatures and pressures in the combustion chamber while also increasing speeds of a piston reciprocating in an engine. Increased speeds, temperatures, and pressures to which the piston is subjected require improved cooling to maintain reliability and reduce wear of the piston.

Many pistons currently improve cooling through injecting oil or other coolants onto an underside of a piston head where the underside of the piston head is not subjected to a combustion environment. U.S. Pat. No. 5,144,922 issued to Lites et al on Sep. 8, 1992 shows a one piece spring plate along with the underside of the piston head forming a cooling gallery. In Lites, oil jets introduce oil into the cooling gallery through a first opening. Oil may exit through a second opening generally opposite the first opening. The spring plate allows oil to enter through the first opening and exit the second opening. Some oil collects in the cooling gallery. As collected oil moves in response to reciprocating of the piston, heat from the piston transfers into the oil and reduces the temperature of the piston.

U.S. Pat. No. 4,986,167 issued to Stratton et al on Jan. 22, 1991 similarly improves cooling similar to Leites by introducing oil into a cooling gallery. A standpipe allows cooling oil into the cooling gallery and acts as a dam to retain oil in the cooling gallery. The oil travels to an oil outlet opposite the standpipe. Unlike Lites, a coolant may not immediately exit the cooling gallery because the standpipe.

Reliably installing the standpipe in the spring plate is critical to keeping sufficient coolant in the cooling gallery. One method of installing the standpipe involves installing the spring plate in the piston and later installing the standpipe. This method requires a mechanical locking mechanism sufficiently robust to withstand vibration, inertia loads, and temperature loading present in a combustion chamber.

The present invention is directed to overcoming one or more of the problems as set forth above.

DISCLOSURE OF THE INVENTION

In one aspect of the present invention a method of assembling a piston includes connecting a baffle plate between said inner surface of a outer annular wall and an inner surface of annular bowl portion. A standpipe is positioned proximate a first end portion of the baffle plate. The standpipe is secured between the first end portion of the first baffle plate and a first end portion of a second baffle plate.

In another aspect of the present invention a piston has an outer annular wall with an inner surface. An annular bowl portion radially inward from the outer annular wall extending has an inner surface. A first baffle plate extends between the inner surface on the annular bowl portion and said inner surface on the outer annular wall. Also, a second baffle plate extends between the inner surface on the annular bowl portion and the inner surface of the outer annular wall. A standpipe is positioned between the first baffle plate and the second baffle plate.

BRIEF DESCRIPTION OF THE DRAWINGS

FIG. 2 shows a cross section view of a piston;

FIG. 3 shows section view of a standpipe in the piston;

FIG. 4 shows a bottom view of the piston; and

FIG. 5 shows a bottom view of the piston having an alternate embodiment of the present invention.

BEST MODE FOR CARRYING OUT THE INVENTION

Figure 1:
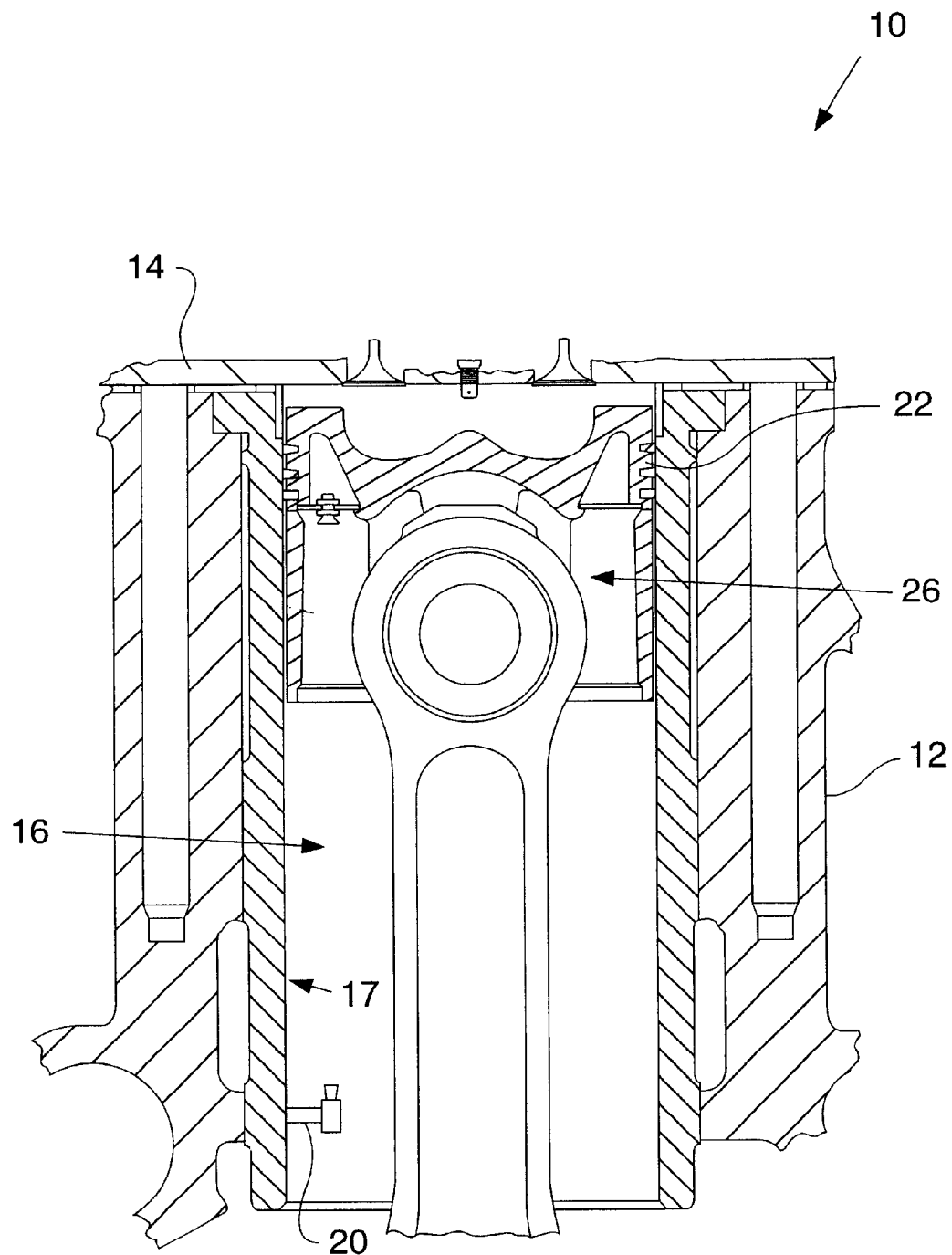
FIG. 1 shows a cross sectioned view of an engine having an embodiment of the present invention.

Referring now to FIG. 1, an internal combustion engine 10 includes an engine block 12 and a cylinder head 14 rigidly secured to the block 12 using conventional fastening mechanisms such as bolts or adhesives (not shown). The block 12 has a plurality of bores 16 therein defining a cylinder wall 17, only one of which is shown. In this application a cylinder liner is be placed in the bores 16 to form the cylinder wall 17. The engine may be any conventional design such as in-line, "V", or radial, and having any number of bores 16.

The engine 10 further includes a plurality of coolant directing nozzles 20. In this application, oil (not shown) is used as the coolant. Each nozzle is rigidly secured to the block 12.

A piston 22 is slidably positioned within the cylinder wall 17. A combustion zone 27 is defined by the piston 22, the cylinder wall 17, and the cylinder head 14. FIG. 2 shows the piston 22 as a generally cylindrical structure having an upper portion 24 and a pin portion 26. In this application, the piston 22 is shown as one piece. However, the piston may be any conventional piston type including an articulated piston.

The upper portion 24 is further defined by a bowl portion 28, a periphery portion 30, and an outer annular wall 32. The bowl portion is defined by an annular bowl portion 34 connected with the periphery portion 30 and a cone bowl portion 36 connected to interior of the annular bowl portion 34. The annular bowl portion 34 has an inner surface 38 separated from the combustion zone 27. In this application the periphery portion 30, the annular bowl portion 34, and cone bowl portion 36 are integral. The cone bowl portion 36 at its apex is generally further from the cylinder head 14 relative to the periphery portion 36. The periphery portion 36 extends radially away from the bowl portion 28 towards the cylinder wall 17. The outer annular wall 32 extends axially away from the periphery portion 30 towards the pin portion 26 and is generally parallel with the cylinder wall 17. The outer annular wall 32 has an inner surface 40 and an outer surface 42. The outer surface 42 has a sealing portion 44 that may be any conventional manner of providing sealing between the piston 22 and the cylinder wall 17 such as a plurality of seal rings 45.

A first baffle plate 46 is connected between a lip portion 48 on the inner surface 38 of the annular bowl portion 34 and a lower edge portion 50 of the inner surface 40 of the outer annular wall 32. The first baffle plate 46 has a receiving groove 52 proximate a first end portion 54. The first baffle plate 46, the inner surface 38 of the annular bowl portion 34 and the inner surface 40 of the outer annular wall 32 define a cooling gallery 55.

FIG. 3 shows a generally cylindrical standpipe 56 of a predetermined length 58. While this application shows the standpipe 56 as funnel shaped other cylindrical shapes such as conical and circular may be used. The standpipe 56 has first sealing band 60 and a second sealing band 62 defining a sealing groove 64. The sealing groove 64 is positioned in the receiving groove 52 such that a second predetermined length 66 of the standpipe 56 extends into the cooling gallery 55. This application shows the standpipe 56 as ovular, but any conventional shape standpipe will work. The standpipe 56 is made of a metallic material such as formed steel, but any material capable of withstanding vibrations, temperatures, pressures, and chemical interactions present in present in areas away from the combustion zone may be used such as molded plastic.

In FIG. 4, a second baffle plate 68 connects between the lip portion 48 and the lower edge portion 50. The second baffle plate 68 has a receiving groove 70 proximate a first end portion 72. The receiving groove 70 of the second baffle plate 68 connects with the sealing groove 64 of the standpipe 56. In this embodiment, the first baffle plate 46 and second baffle plate 68 abut each other about 180 degrees from the standpipe 56. Alternatively, additional baffle plates may also be used so long as a first baffle plate 46 and second baffle plate 68 secure the standpipe 56 above the coolant supply jet 20.

FIG. 5 shows an alternative embodiment having a drain hole formed by a second receiving groove 74 of the first baffle plate 46' and a second receiving groove 76 of the second baffle plate 68' located 180 degrees from the standpipe 56'. In this application a drain pipe 73 connects between the second receiving grooves in generally the same fashion as the standpipe 56.

INDUSTRIAL APPLICABILITY

Installation of the standpipe 56 in this application is simplified and provides improved reliability. The first baffle plate 46 may be installed between the lip portion 48 and lower edge 50. The sealing groove 64 on the standpipe 56 is then inserted into the receiving groove 70 on the first baffle plate 46. The sealing groove 64 and receiving grooves 52, 70 have close tolerances. However, the standpipe 56 allows movement of the first baffle plate 46. Installing the standpipe 56 after the first baffle plate 46 reduces problems associated with clearance between the standpipe 56 and ring belt portion 50 present with a pre-installed standpipe. The second baffle plate 68 is then installed similar to the first baffle plate 46.

Once the piston 22 including the standpipe 56 is installed in the engine 10, the standpipe 56 in the first embodiment allows coolant from the oil jet 20 to enter the cooling gallery 55. The second predetermined length 66 prevents coolant from exiting the cooling gallery 55 through the standpipe 56 until coolant levels in the cooling gallery 55 exceed the second predetermined length 66. However, generally coolant may escape from gaps between the first baffle plate 46 and second baffle plate 68 or other fits between the baffle plates 46, 68 and the lip portion 48 or lower edge portion 50.

In the alternate embodiment, the drain pipe 73 may further control egress of coolant from the cooling gallery 55. The second receiving grooves 74, 76 on the first baffle plate and second baffle plate further limit leakage between first baffle plate 46 and second baffle plate 68.

Other aspects, objects, and advantages of this invention can be obtained from a study of drawings, the disclosure, and the appended claims.

What is claimed is:

1. A method of assembling a piston having a cooling gallery where said piston includes an outer annular wall having an inner surface and an annular bowl portion having an inner surface, said method comprising the steps of:

connecting a baffle plate between said inner surface of said outer annular wall and said inner surface of said annular bowl portion, said baffle plate having a first end portion;

positioning a standpipe proximate said first end portion of said baffle plate, said standpipe extending axially towards said bowl portion;

securing said standpipe between said first end portion of said first baffle plate and a first end portion of a second baffle plate; and connecting said second baffle plate between said inner surface of said outer annular wall and said inner surface of said annular bowl portion, first baffle plate, said second baffle plate, said inner surface of said annular bowl portion, and said inner surface of said outer annular wall defining said cooling gallery.

2. The method as specified in claim 1 where in said positioning step is inserting said standpipe in a receiving groove in said first baffle plate.

3. The method as specified in claim 2 wherein said receiving groove on said first baffle plate and a receiving groove on said second baffle plate engage a sealing groove on said standpipe.

4. The method as specified in claim 1 wherein said connecting step is securing said first baffle plate between a lip portion on said inner surface of said annular bowl portion and a lower edge portion on said inner surface of said outer annular wall.

5. The method as specified in claim 1 further comprising the step of abutting said first baffle plate against said second baffle plate distal from said standpipe.

6. A piston having a cooling gallery, said piston comprising:

a top portion defining an annular bowl portion and a periphery portion;

an outer annular wall extending axially from said periphery portion, said outer annular wall having an inner surface;

said annular bowl portion extending axially from said top portion radially inward from said outer annular wall, said annular bowl portion having an inner surface;

a first baffle plate extending between said inner surface on said annular bowl portion and said inner surface of said outer annular wall, said first baffle plate having a first receiving groove proximate a first end portion;

a second baffle plate extending between said inner surface on said annular bowl portion and said inner surface of said outer annular wall, said second baffle plate having a first receiving groove proximate a first end portion of said second baffle plate; and a standpipe positioned between said first receiving groove of said first baffle plate and said first receiving groove of said second baffle plate, said cooling gallery being defined by said first baffle plate, said second baffle plate, said inner surface of said annular bowl portion, and said inner surface of said outer annular wall.

7. The piston as specified in claim 6 further comprising a drain hole between said first baffle plate and said second baffle plate.

8. The piston as specified in claim 7 further comprising a drain pipe positioned in said drain hole.

9. The piston as specified in claim 6 wherein said standpipe is made from steel.

10. The piston as specified in claim 6 wherein said standpipe is funnel in shaped.

* * * * *